(12) United States Patent
Kapala et al.

(10) Patent No.: US 11,659,425 B2
(45) Date of Patent: *May 23, 2023

(54) SYSTEMS AND METHODS FOR DETECTING INTERFERENCE PROBABILITY WITHIN A RADIO FREQUENCY BAND

(71) Applicant: Verizon Patent and Licensing Inc., Basking Ridge, NJ (US)

(72) Inventors: Matthew Kapala, North Billerica, MA (US); Ricardo Francisco Borges, Noblesville, IN (US); Brian A. Ward, Fort Worth, TX (US); Scott A. Townley, Gilbert, AZ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/658,700

(22) Filed: Apr. 11, 2022

(65) Prior Publication Data

US 2022/0240115 A1    Jul. 28, 2022

Related U.S. Application Data

(63) Continuation of application No. 16/948,566, filed on Sep. 23, 2020, now Pat. No. 11,317,304.

(51) Int. Cl.
*H04W 24/08* (2009.01)
*H04B 17/318* (2015.01)
*H04B 17/345* (2015.01)
*H04W 24/02* (2009.01)

(52) U.S. Cl.
CPC .......... *H04W 24/08* (2013.01); *H04B 17/318* (2015.01); *H04B 17/345* (2015.01); *H04W 24/02* (2013.01)

(58) Field of Classification Search
CPC .... H04W 24/08; H04W 24/02; H04B 17/318; H04B 17/345
See application file for complete search history.

(56) References Cited

U.S. PATENT DOCUMENTS

| 2008/0227405 | A1* | 9/2008 | Harel | H04W 52/42 455/135 |
|---|---|---|---|---|
| 2009/0082026 | A1 | 3/2009 | Yavuz et al. | |
| 2014/0274094 | A1 | 9/2014 | Abdelmonem et al. | |
| 2015/0189649 | A1 | 7/2015 | Fouillot | |

(Continued)

*Primary Examiner* — Duc C Ho

(57) ABSTRACT

A device may receive location information associated with a fixed service satellite station (receiver) configured to communicate via a first radio frequency (RF) band. The device may obtain historical communication data associated with the location and relating to previous communications conducted via a second RF band, of user equipment (UEs). The historical communication data may include historical signal power measurements of the previous communications. The device may adjust the historical signal power measurements to model estimated signal power measurements relating to a UE to communicating via a first RF band. The device may determine, based on the estimated signal power measurements, an interference score associated with a probability of a UE interfering with the receiver when communicating, via a first RF band, with a base station.

20 Claims, 7 Drawing Sheets

300 ⟶

(56) References Cited

U.S. PATENT DOCUMENTS

| | | |
|---|---|---|
| 2015/0382371 A1 | 12/2015 | LIU et al. |
| 2017/0188314 A1* | 6/2017 | Mueck .................. H04W 24/02 |
| 2021/0158237 A1* | 5/2021 | Atwater ............... G06V 20/188 |

* cited by examiner

130 dampen historical power measurements for the current RF band used by UEs to model estimations for targeted RF band associated with the receiver Previous Downlink Communication Data

| DL Record ID | Current RF band DL Pwr | Power Gain/Loss | Targeted RF band DL Pwr Estimate |
|---|---|---|---|
| DL_1 | C_DLPwr_1 | GL_1 | T_DLPwr_1 + GL_1 |
| DL_2 | C_DLPwr_2 | GL_2 | T_DLPwr_2 + GL_2 |
| DL_3 | C_DLPwr_3 | GL_3 | T_DLPwr_3 + GL_3 |
| ... | ... | ... | ... |

Previous Uplink Communication Data

| UL Record ID | Current band UL Pwr | Path Loss | Targeted band UL Pwr Estimate |
|---|---|---|---|
| UL_1 | C_ULPwr_1 | PL_1 | T_ULPwr_1 - PL_1 |
| UL_2 | C_ULPwr_2 | PL_2 | T_ULPwr_2 - PL_2 |
| UL_3 | C_ULPwr_3 | PL_3 | T_ULPwr_3 - PL_3 |
| ... | ... | ... | ... |

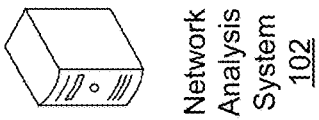

Network Analysis System 102

SYSTEMS AND METHODS FOR DETECTING INTERFERENCE PROBABILITY WITHIN A RADIO FREQUENCY BAND

RELATED APPLICATION

This application is a continuation of U.S. patent application Ser. No. 16/948,566, entitled "SYSTEMS AND METHODS FOR DETECTING INTERFERENCE PROBABILITY WITHIN A RADIO FREQUENCY BAND," filed Sep. 23, 2020 (now U.S. Pat. No. 11,317,304), which is incorporated herein by reference in its entirety.

BACKGROUND

A wireless telecommunication network may provide various wireless telecommunication services such as telephony, video, data, and messaging. The wireless telecommunication network may include a number of base stations (e.g., a Node B, an eNB, a gNB, an access point (AP), a radio head, a transmit receive point (TRP), and/or the like) that can support communication for a number of user equipment (UEs). A UE may communicate with a base station via a downlink and an uplink. The downlink refers to the communication link from the base station to the UE, and the uplink refers to the communication link from the UE to the base station.

BRIEF DESCRIPTION OF THE DRAWINGS

FIGS. 1A-1D are diagrams of one or more example implementations described herein.

DETAILED DESCRIPTION OF PREFERRED EMBODIMENTS

Figure 1A:
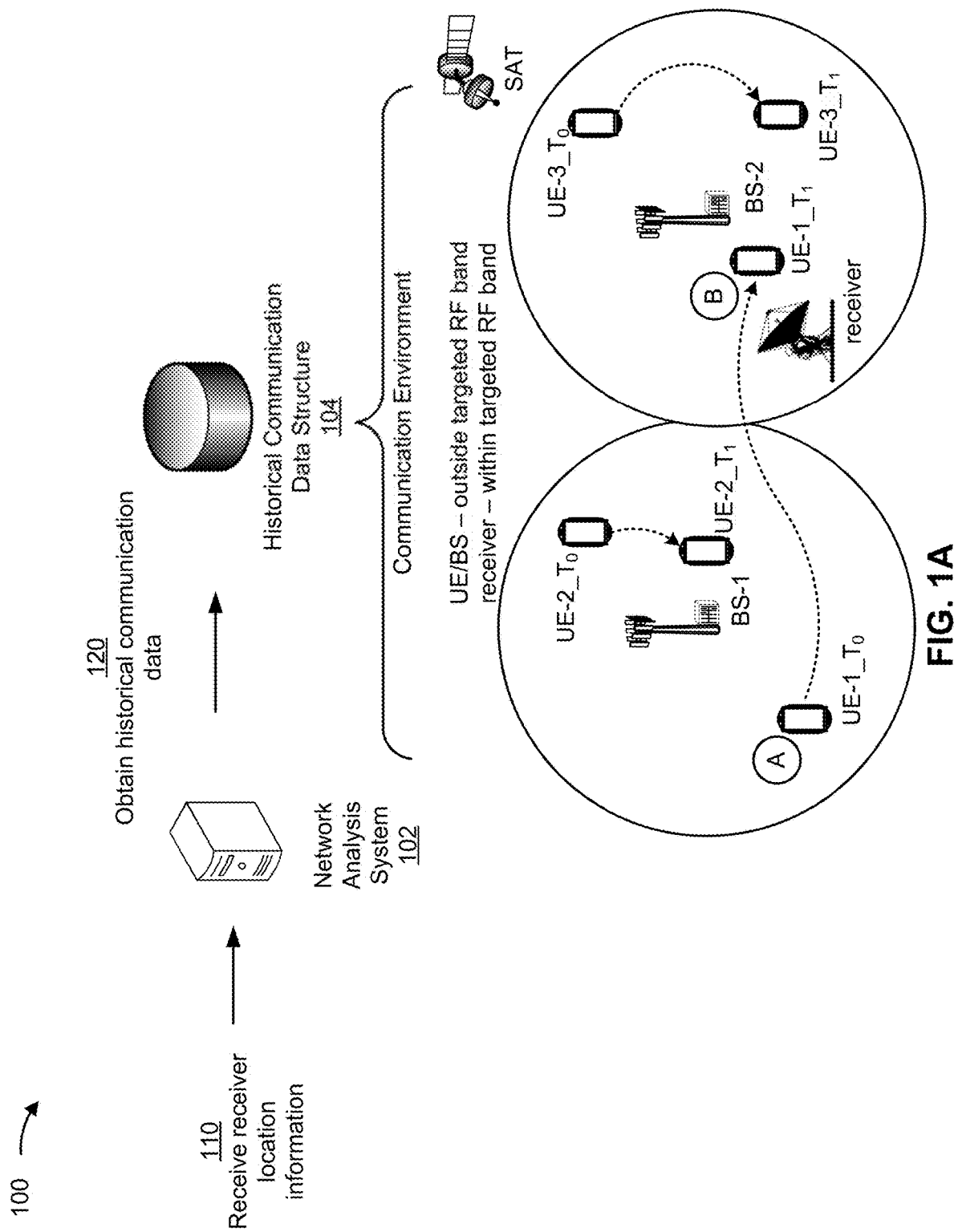

The following detailed description of example implementations refers to the accompanying drawings. The same reference numbers in different drawings may identify the same or similar elements.

Currently, some receivers provide radiotelecommunication services via particular bands of a radio frequency (RF) spectrum (e.g., a portion of the electromagnetic spectrum in a range of frequencies with various ranges). As targeted RF bands becomes available for wireless telecommunication services, a wireless telecommunication service provider (hereinafter referred to as "service provider") may desire to enable wireless telecommunication services within the available spectrum.

For example, the service provider may desire to enable a base station (e.g., a gNB) to support wireless telecommunication services, via an available portion of a targeted RF band, for a number of user equipment (UEs) that typically communicate via a current RF band. However, the transmission signal power associated with such UEs (e.g., when communicating via the targeted RF band) may cause an interference with an operation of an incumbent receiver that is located within a vicinity of the base station and that operates via another portion of the targeted RF band. The interference may cause communication disruption, packet loss, packet latency, packet jitter, packet retransmission, and/or the like. Accordingly, the interference may waste computing resources, network resources, and/or the like associated with remedying the communication disruption, the packet loss, the packet latency, the packet jitter, the packet retransmission, and/or the like.

Some implementations described herein enable a network analysis system to determine a probability that a UE will interfere with an incumbent receiver (configured to communicate via the targeted RF band) when the UE communicates, via the targeted RF band, with a base station. For example, the network analysis system may receive location information associated with an incumbent receiver. The location information may identify a location of the incumbent receiver. The incumbent receiver may be configured to communicate via a first radio frequency RF band. The network analysis system may obtain historical signal power measurements associated with the location and relating to previous communications, via a second RF band, of a plurality of UEs. The historical communication data may include historical signal power measurements of the previous communications.

The network analysis system may adjust the historical signal power measurements to model estimated signal power measurements relating to a UE communicating via the first RF band. The network analysis system may determine, based on the estimated signal power measurements, an interference score associated with the UE using the first RF band to communicate. The interference score may be associated with a probability of the UE interfering with the incumbent receiver when communicating, via the first RF band, with a base station. The network analysis system may perform, based on the interference score, an action associated with a network facilitating communication with the UE via the first RF band.

By determining the interference score, the network analysis system may prevent interference at an incumbent receiver (communicating via the targeted RF band) when the UE communicates via the targeted RF band. By preventing the interference, the network analysis system may conserve computing resources, network resources, and/or the like that would have been used to remedy packet loss, packet latency, packet jitter, packet retransmission, and/or the like associated with the interference.

While the description provided herein discusses preventing interference associated with the targeted RF band, the techniques described herein are equally applicable to preventing interference associated with any band of the RF spectrum.

FIGS. 1A-1D are diagrams of one or more example implementations 100 described herein. As shown in FIG. 1A, network analysis system 102 may be associated with a historical communication data structure 104, one or more base stations, and one or more user equipment (UEs). Network analysis system 102 may include a system or platform that determines an interference score associated with a probability of a UE interfering with an incumbent receiver (communicating via a targeted RF band of an RF spectrum) when the UE communicates, via the targeted RF band, with a base station located in a vicinity of the incumbent receiver.

Historical communication data structure 104 may include a data structure (e.g., a database, a linked list, a table, and/or the like) that stores historical communication data. The one or more base stations may include one or more devices that can support communication for the one or more UEs. The one or more UEs may include one or more wireless communication devices. For example, the one or more UEs may include one or more cellular communication devices.

As shown in FIG. 1A, and by reference number 110, network analysis system 102 may receive receiver location information. The receiver location information may identify a location (e.g., geographical location) of an incumbent receiver that is configured to communicate via the targeted RF band. The incumbent receiver may include, as an example, a satellite communication device. For example, the incumbent receiver may include a fixed satellite service stations (FSSS). In some implementations, network analysis system 102 may receive, from a device of a user (e.g., a technician, a network operator, and/or the like), a request to determine a probability of a UE interfering with the incumbent receiver when the UE is communicating via the targeted RF band in a geographical area. The geographical area may include an area surrounding the location of the incumbent receiver. The request may include information identifying the geographical area, a geographical location within the geographical area, and/or the like.

Based on receiving the request from the device, network analysis system 102 may transmit a receiver search request (e.g., a message including the information identifying the geographical area, the geographical location, and/or the like) to identify one or more receivers located within the geographical area, at the geographical location, and/or the like. For example, based on receiving the request, network analysis system 102 may establish a communication session with a geographical information system and transmit the receiver search request (e.g., a message including the information identifying the geographical area, the geographical location, and/or the like) to identify one or more receivers located within the geographical area, at the geographical location, and/or the like.

Based on the receiver search request, network analysis system 102 may receive the receiver location information from the geographical information system. The receiver location information may include geographical coordinates (e.g., a combination of a latitudinal coordinate, a longitudinal coordinate, and/or an elevation), a physical address (e.g., a street name and a street number), and/or the like.

In some implementations, network analysis system 102 may receive the receiver location information from the device of the user. For example, the receiver location may be included in the request received from the user. For example, the receiver location may be received, from the device, as a physical address in the form of textual data describing a street address and a street number associated with the incumbent receiver.

As shown in FIG. 1A, and by reference number 120, network analysis system 102 may obtain historical communication data. In some implementations, network analysis system 102 may obtain the historical communication data based on the request to determine the probability of a UE interfering with the incumbent receiver. The historical communication data may include information identifying historical signal power measurements of previous communications of a plurality of user equipment (UEs). In some implementations, the historical signal power measurements may be used to determine a measure of interference by the UEs and/or base stations (e.g., gNBs) with the incumbent receiver when the incumbent receiver and the UEs and/or base stations are communicating via a same RF band. Alternatively, the historical signal power measurements may be used to determine a measure of interference from the UEs and/or base stations (e.g., gNBs) with the incumbent receiver when the incumbent receiver is communicating via an RF band that is adjacent to an RF band via which the UEs and/or base stations communicate. In this regard, for example, the historical signal power measurements may be adjusted to model estimated signal power measurements relating to the UEs communicating via the targeted RF band in order to determine whether the UEs will interfere with the incumbent receiver (configured to communicate via the targeted RF band) when the UEs communicate via the targeted RF band.

The historical communication data may be associated with the location and may relate to the previous communications of the plurality of UEs (e.g., within the geographical area, within a threshold distance of the location of the incumbent receiver, and/or the like). The previous communication may include communications, via a band (of the RF spectrum) currently used by the UES, between the UEs and one or more base stations located within the threshold distance of the location of the incumbent receiver. The geographical area may correspond to an area encompassing the threshold distance of the location of the incumbent receiver. As shown in FIG. 1A, the historical communication data may be obtained from historical communication data structure 104. In some implementations, historical communication data structure 104 may store historical communication data in association information identifying a geographical location, a geographical area, geographical coordinates, and/or the like.

Network analysis system 102 may obtain the historical communication data from historical communication data structure 104 based on the receiver location, based on information identifying the geographical location, and/or the like. The historical communication data, obtained from historical communication data structure 104, may include information identifying historical signal power measurements of the previous communications. The historical signal power measurements may be associated with previous downlink communications and previous uplink communications. The information identifying the historical signal power measurements may include records identifying downlink signal power and uplink signal power for the previous communications.

For example, a record may identify a communication of a UE and may include information identifying the UE, information identifying a geographical location of the UE, a timestamp (e.g., date, time, and/or the like), an uplink signal power or a downlink signal power, information identifying a base station with which the UE is communicating, and/or the like associated with the communication. The information included in the records may be based on data transmitted or received by the UE and may be stored in historical communication data structure 104. The records may correspond to previous communications within the geographical area that includes the location of the incumbent receiver. The previous communications may be via one or more channels of the current RF band and with one or more base stations.

As example, consider a UE identified as UE-1 as shown in FIG. 1A. Based on data transmitted by UE-1, historical communication data structure 104 may include a first record identifying UE-1 as being located at location A at time $T_0$ and as transmitting an uplink communication (to a base station BS-1) associated with a particular uplink signal power. Base station BS-1 may be outside a threshold distance of the location of the incumbent receiver and Location A may be outside the geographical area.

Based on additional data transmitted by UE-1, historical communication data structure 104 may include a second record identifying UE-1 as being located at location B at time Ti and as receiving a downlink communication (from a base station BS-2) associated with a particular downlink signal power. Base station BS-2 may be within the threshold distance the location of the incumbent receiver and Location B may be within the geographical area. UE-1, BS-1, and BS-2 may communicate via the current RF band while the incumbent receiver may communicate via the targeted RF band.

In some implementations, historical communication data structure 104 may store historical communication data relating to previous communications within the geographical area. For example, historical communication data structure 104 may store information identifying historical signal power measurements of the previous communications within the geographical area. Accordingly, historical communication data structure 104 may store a record associated with the downlink communication (e.g., because Location B may be within the geographical area) and exclude information regarding the uplink communication (e.g., because Location A may be outside the geographical area).

Alternatively, historical communication data structure 104 may store historical communication data relating to previous communications within and outside the geographical area. For example, historical communication data structure 104 may store information identifying historical signal power measurements of the previous communications within and outside the geographical area. Accordingly, historical communication data structure 104 may store the record associated with the downlink communication and a record associated with the uplink communication.

As shown in FIG. 1B, and by reference number 130, network analysis system 102 may mathematically adjust the historical power measurements for the current RF band used by UEs to model estimations for the targeted RF band or other RF bands to be associated with the incumbent receiver. For example, the current RF band may include, but is not limited to, one of 600 MHz band, 750 MHz band, 850 MHz band, Personal Communication Services (PCS) band, and/or Advance Wireless Services (AWS) band of the RF spectrum and the targeted band may include another one of the 600 MHz band, the 750 MHz band, the 850 MHz band, the PCS band, and/or AWS band of the RF spectrum. For instance, the current RF band may include an R band and the targeted band may include a C band. In this regard, network analysis system 102 may adjust the historical power signal measurements from a first RF band to model a second RF band (e.g., based on a frequency, bandwidth, and/or path loss associated with the first RF band), as described below. For instance, network analysis system 102 may mathematically adjust the historical power measurements for the current RF band via one or more mathematical functions such as, for example, a logarithmic function.

In some implementations, the incumbent receiver may communicate via a portion of the targeted RF band (hereinafter "receiver portion of the targeted RF band") and the estimations may be associated with another portion of the targeted RF band (hereinafter "available portion of the targeted RF band"). The receiver portion of the targeted RF band may correspond to one or more channels of the targeted RF band and the available portion of the targeted RF band may correspond to one or more other channels of the targeted RF band. In some implementations, a channel of the available portion of the targeted RF band may be within a threshold frequency range of a channel of the available portion of the targeted RF band.

The historical power signal measurements may correspond to power signal measurements for the current RF band. As an example, one or more channels (of the current RF band) may be associated with approximately 1.7 GHz for uplink communication and approximately 2.1 GHz for downlink communication. As an example, a frequency associated with the available portion of the targeted RF band may be approximately 3.7 GHz to approximately 3.98 GHz. Because of the difference in frequencies between the current RF band and the targeted RF band (e.g., the available portion of the targeted RF band), network analysis system 102 may adjust the power signal measurements from the current RF band to model estimated power signal measurements for the targeted RF band (e.g., the available portion of the targeted RF band).

For example, in order to adjust the power signal measurements, network analysis system 102 may make adjustments based on a power loss and power gain associated with downlink communication via the current RF band (e.g., to simulate a targeted RF band power loss), as will be discussed in more detail below. Additionally, or alternatively, network analysis system 102 may make adjustments based on path loss associated with uplink communication via the current RF band, as will be discussed in more detail below. Network analysis system 102 may perform such adjustments to compensate for different propagation characteristics and band sizes between different RF bands (e.g., between the current RF band and the targeted RF band).

As part of adjusting the historical power signal measurements, network analysis system 102 may identify, from the historical signal power measurements, downlink signal power measurements associated with previous downlink communications (e.g., from one or more base stations to one or more of the plurality of UEs). For instance, network analysis system 102 may search the records to identify records including information identifying a downlink power signal. In some implementations, network analysis system 102 may search the records, of downlink signal power measurements, to identify records identifying a location that is included in a geographical area of a predetermined shape and size.

The geographical area may be an appropriately sized geographical area with a shape of a circle, an ellipse, a square, a rectangle, and/or the like. In some examples, the geographical area may be based on a military grid reference system. The value and shape of the geographical area are merely provided as examples. Other examples may differ from what is described with regard to the value and shape of the geographical area.

Additionally, or alternatively, network analysis system 102 may search the records, of the downlink signal power measurements, to identify records that include a timestamp within a particular downlink period of time (e.g., a particular date, time, hour, minute, and/or the like). The particular downlink period of time may be identified by the user via the device. As an example, the particular downlink period of time may be included in the request received from the device of the user. In some implementations, network analysis system 102 may identify a maximum downlink signal power measurement associated with one or more corresponding base stations during the particular downlink period of time.

In some implementations, the downlink signal power measurements may be associated with corresponding base stations transmitting at full power. For example, a majority of the corresponding base stations may be transmitting at full power. Network analysis system 102 may identify such base stations as base stations that may cause an interference with the incumbent receiver.

Network analysis system 102 may convert the downlink signal power measurements to estimated downlink signal power measurements based on downlink power gain and/or power loss associated with a downlink channel of the current RF band. For example, network analysis system 102 may increase a power gain associated with a downlink signal power measurement to account for a bandwidth difference between the current RF band and the targeted RF band. Additionally, or alternatively, network analysis system 102 may increase a power loss associated with the downlink signal power measurement to account for a frequency difference between the current RF band and the targeted RF band. For example, as shown in FIG. 1B, network analysis system 102 may determine an estimated downlink signal power measurement based on the following equation:

$$\text{targeted } RF \text{ band } DL \text{ Pwr Estimate} = \qquad (1)$$
$$\text{current } RF \text{ band } DL \text{ Pwr} + \text{Power Gain/Loss,}$$

where targeted RF band DL Power Estimate represents an estimated downlink signal power measurement, current RF band DL Pwr represents a downlink signal power measurement, and Power Gain/Loss represents an increase in power gain and/or power loss.

As an example, network analysis system 102 may apply corrections due to differences between the frequencies in the target RF band and in the current RF band. Assume that the UE is transmitted data via the current RF and a frequency of the current RF band is used as an estimate with respect to the effects on the incumbent receiver if the UE were to transmit and receive data via the targeted RF band. In this case, a translation may be applied for the power received at the incumbent receiver (for both downlink and uplink cases). As an example, such a translation would be to adjust the received power of the incumbent receiver by, for example, $$20 * \log 10(f2/f1), \qquad (2)$$

where f1 represents a frequency associated with communications, by the incumbent receiver, via the targeted RF band and where f2 represents a frequency associated with communications, by the UE, via the current RF band. The above equations are merely provided as examples. Other examples may differ from what is described with regard to the above equations.

As part of adjusting the historical power signal measurements, network analysis system 102 may identify, from the historical signal power measurements, uplink signal power measurements associated with previous uplink communications (e.g., from one or more base stations to one or more of the plurality of UEs). For instance, network analysis system 102 may search the records to identify records including information identifying an uplink power signal.

In some implementations, network analysis system 102 may search the records, of the uplink signal power measurements, to identify records identifying a location that is included in an appropriate geographical area (of a predetermined shape and size) surrounding the location of the receiver (e.g., three hundred meter squared or the like). In some implementations, the geographical area when identifying records for uplink signal power measurements may exceed the geographical area when identifying records for downlink signal power measurements.

The geographical area may have a shape of a circle, an ellipse, a square, a rectangle, and/or the like. The value and shape of the geographical area are merely provided as examples. Other examples may differ from what is described with regard to the value and shape of the geographical area. In some implementations, an uplink signal power measurement may correspond to an out of band emissions (OOBE), of a corresponding UE, that is calculated based on an effective isotopically radiated power (EIRP) of the UE. The EIPR may be calculated based on a maximum transmission power of the UE and a power headroom of the UE.

Network analysis system 102 may search the records, of the uplink signal power measurements, to identify and remove duplicate records associated with a same UE and including a same timestamp. For example, network analysis system 102 may search the records to identify records including a timestamp that is included in a particular uplink period of time and identify duplicate records associated with a same UE and including a same timestamp (e.g., included in the particular uplink period of time).

In some implementations, the particular uplink period of time may be identified by the user. For example, the particular uplink period of time may be included in the request received from the device of the user. Network analysis system 102 may identify a record including information identifying a highest uplink signal measurement (out of the duplicate records associated with the same UE) and discard the other duplicate record(s). In some implementations, network analysis system 102 may identify the record (including the information identifying the highest uplink signal measurement) and the UE in order to improve the calculations/computation to determine the probability of interference with the incumbent receiver.

The uplink signal power measurements may be converted to estimated uplink signal power measurements (e.g., adjusted to model the estimated uplink signal power measurements) based on a path loss associated with locations of the plurality of UEs during the previous uplink communications (e.g., communications associated with an uplink channel of the current RF band). For example, network analysis system 102 may determine (or estimate) an uplink signal power measurement at the location of receiver (instead of the uplink signal power measurement at a location of the UE identified in the record). For instance, network analysis system 102 may subtract a path loss from the uplink signal power measurement to obtain an estimated uplink signal power measurement at the location of the incumbent receiver. In some implementations, the path loss may be determined based on a distance between the incumbent receiver and the UE.

As shown in FIG. 1B, network analysis system 102 may update the records of the downlink signal power measurements to include information identifying the estimated downlink signal power measurements. Similarly, network analysis system 102 may update the records of the uplink signal power measurements to include information identifying the estimated uplink signal power measurements.

Figure 1C:
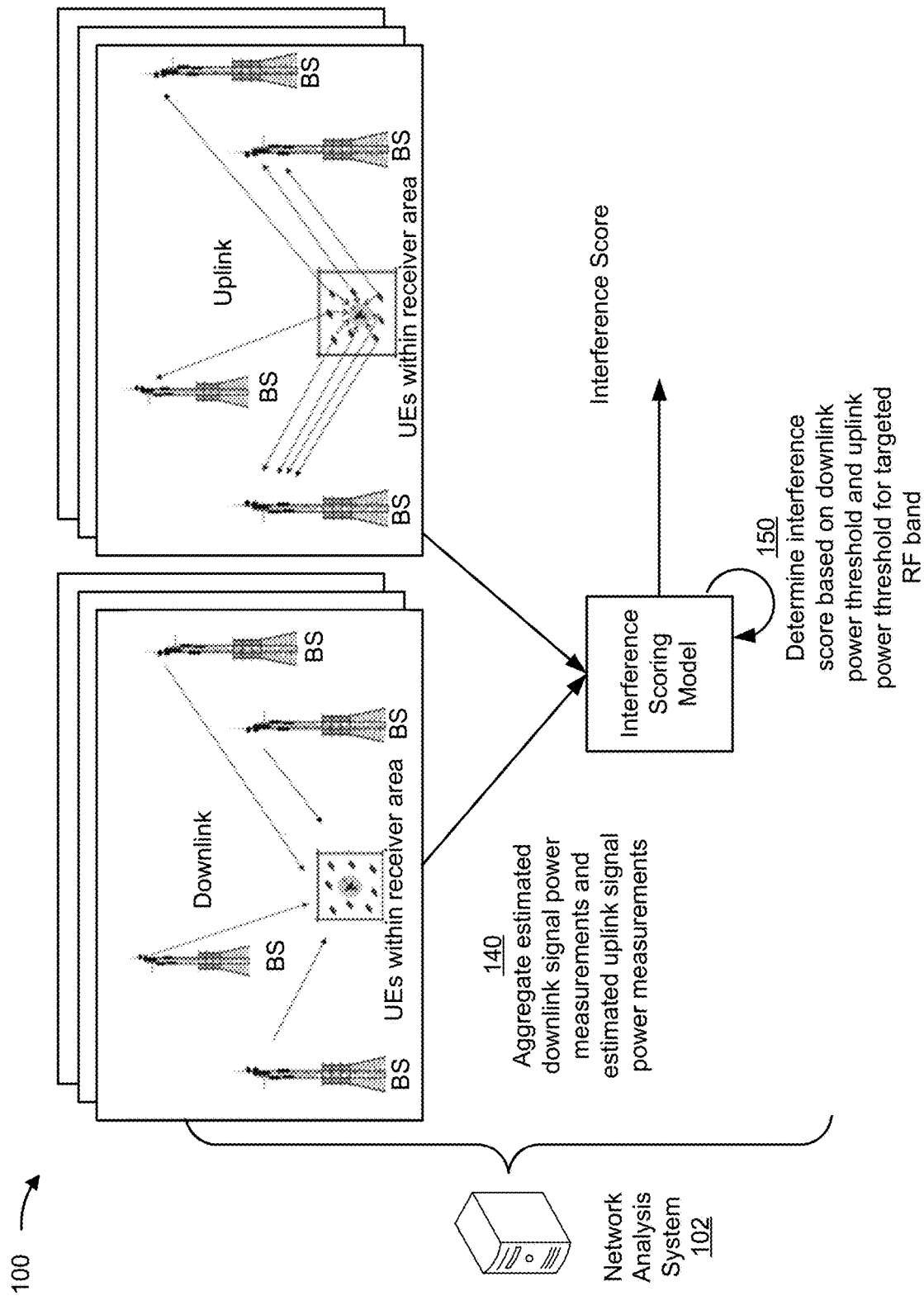

As shown in FIG. 1C, and by reference number 140, network analysis system 102 may aggregate estimated downlink signal power measurements and estimated uplink signal power measurements. In some implementations, network analysis system 102 may combine the estimated downlink signal power measurements to obtain a total estimated downlink signal power measurements (e.g., total estimated downlink signal power measurements during the particular downlink period of time). For example, network analysis system 102 may calculate a linear sum of the estimated downlink signal power measurements to obtain the total estimated downlink signal power measurements.

Additionally, network analysis system 102 may combine the estimated uplink signal power measurements to obtain a total estimated uplink signal power measurements. For example, network analysis system 102 may calculate a linear sum of the estimated downlink signal power measurements to obtain a total estimated uplink signal power measurements (e.g., during the particular uplink period of time) to obtain the total estimated uplink signal power measurements (e.g., total estimated uplink signal power measurements during the particular uplink period of time).

The manner of combining the estimated downlink signal power measurements and estimated uplink signal power measurements is merely provided as an example. Other examples may differ from what is described with regard to combining the estimated downlink signal power measurements and estimated uplink signal power measurements.

As shown in FIG. 1C, and by reference number 150, network analysis system 102 may determine an interference score based on a downlink signal power threshold for the targeted RF band and an uplink signal power threshold for the targeted RF band. The interference score may be associated with a probability of a UE interfering with the incumbent receiver when the UE is communicating, via the targeted RF band, with a base station within a threshold distance of the location of the incumbent receiver. The downlink signal power threshold may be associated with power measurements, of downlink communications to the UE, that may cause an interference with the incumbent receiver. The uplink signal power threshold may be associated with power measurements, of uplink communications from the UE, that may cause an interference with the incumbent receiver. In some implementations, the uplink signal power threshold may exceed the downlink signal power threshold.

Network analysis system 102 may determine the interference score based on the estimated downlink signal power measurements and the downlink signal power threshold and based on the estimated uplink signal power measurements and the uplink signal power threshold. For example, when determining the interference score, network analysis system 102 may compare of the total downlink signal power measurements and the downlink signal power threshold. For instance, network analysis system 102 may determine a probability of a UE interfering with the incumbent receiver when the total downlink signal power measurements exceeds the downlink signal power threshold and may determine a downlink interference score indicating such probability. Conversely, network analysis system 102 may determine a probability of a UE not interfering with the incumbent receiver when the total downlink signal power measurements does not exceed the downlink signal power threshold and may determine a downlink interference score indicating such probability.

In some implementations, network analysis system 102 may determine the downlink interference score based on a difference between the total downlink signal power measurements and the downlink signal power threshold. For example, the downlink interference score may increase based on an amount by which the total downlink signal power measurements exceeds the downlink signal power threshold. Conversely, the downlink interference score may decrease based on an amount by which the downlink signal power threshold exceeds the total downlink signal power measurements. In some implementations, a downlink interference score indicating a probability of a UE interfering with the incumbent receiver may exceed a downlink interference score indicating a probability of a UE not interfering with the incumbent receiver.

Additionally, network analysis system 102 may compare the total uplink signal power measurements and the uplink signal power threshold. For instance, network analysis system 102 may determine a probability of a UE interfering with the incumbent receiver when the total uplink signal power measurements exceeds the uplink signal power threshold and may determine an uplink interference score indicating such probability. Conversely, network analysis system 102 may determine a probability of a UE not interfering with the incumbent receiver when the total uplink signal power measurements does not exceed the uplink signal power threshold and may determine an uplink interference score indicating such probability.

Network analysis system 102 may determine the uplink interference score based on a difference between the total uplink signal power measurements and the uplink signal power threshold. For example, the uplink interference score may increase based on an amount by which the total uplink signal power measurements exceeds the uplink signal power threshold. Conversely, the uplink interference score may decrease based on an amount by which the uplink signal power threshold exceeds the total uplink signal power measurements. In some implementations, an uplink interference score indicating a probability of a UE interfering with the incumbent receiver may exceed an uplink interference score indicating a probability of a UE not interfering with the incumbent receiver.

In some implementations, network analysis system 102 may combine the downlink interference score and the uplink interference score to determine the interference score. In some implementations, network analysis system 102 may determine the interference score using an interference scoring model. The interference scoring model may correspond to a scoring system that determines a score associated with a probability of a UE interfering with the incumbent receiver based on the downlink interference score, the uplink interference score, characteristics of the incumbent receiver, characteristics of the UE, characteristics of the base station, and/or the like.

Using such a scoring system, network analysis system 102 can apply weights (w) to the downlink interference score, the uplink interference score, and/or to parameters corresponding to the characteristics of the incumbent receiver (e.g., RF band, geographical location, and/or the like), characteristics of the UE (e.g., uplink signal power, RF band, geographical location, distance from the incumbent receiver, date(s) and/or time(s) of communication(s), and/or the like), characteristics of the base station (e.g., downlink signal power, geographical location, RF band, distance from the incumbent receiver, date(s) and/or time(s) of communication(s), and/or the like), and/or the like. Accordingly, network analysis system 102 can determine (e.g., via one or more calculations associated with the scoring system) scores based on the scoring system that are representative of a probability that a UE interferes with the incumbent receiver when the UE is communicating, via the targeted RF band, with a base station within a threshold distance of the location the incumbent receiver.

In some implementations, an interference score that satisfies a threshold probability score may indicate a probability of interference with the incumbent receiver that exceeds a probability of interference with the incumbent receiver indicated by an interference score that does not satisfy the threshold probability score. For example, an interference score that satisfies the threshold probability score may indicate a high probability of interference while an interference score that does not satisfy the threshold probability score may indicate a low probability of interference.

Figure 1D:
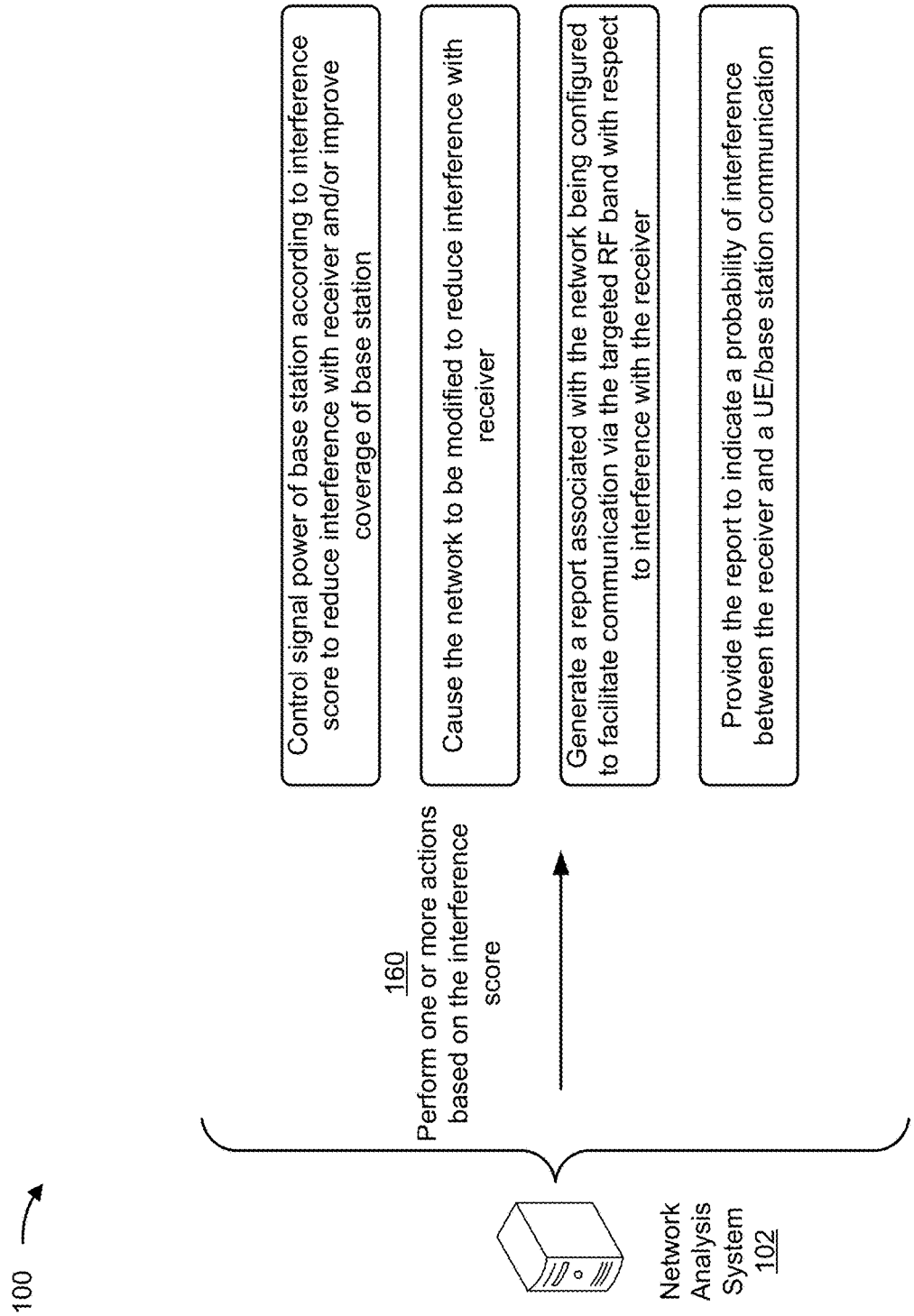

As shown in FIG. 1D, and by reference number 160, network analysis system 102 may perform one or more actions based on the service qualification metric. In some implementations, the one or more actions may include network analysis system 102 controlling signal power of a base station according to an interference score to reduce interference with the incumbent receiver and/or improve coverage of the base station.

For example, network analysis system 102 may control, based on the interference score, a signal power of the base station to decrease the signal power when the interference score satisfies the threshold probability score (e.g., a threshold probability of interfering with the incumbent receiver). For instance, network analysis system 102 may cause a transmission power of a base station to be decreased, cause a transmission power of one or more UEs to be decreased, and/or the like to reduce a probability of interference with the incumbent receiver.

Additionally, or alternatively, when the interference score does not satisfy the threshold probability score, network analysis system 102 may cause a transmission power of a base station to be increased, cause a transmission power of one or more UEs to be increased, and/or the like. In this regard, network analysis system 102 may increase a coverage area of the base station (e.g., to an area closer to the incumbent receiver).

In some implementations, network analysis system 102 may obtain additional signal power measurements of communications of other UEs using the targeted RF band, determine one or more updated interference scores based on the additional signal power measurements, and adjust the signal power of the base station based on the one or more updated interference scores.

In some implementations, the one or more actions may include network analysis system 102 causing the network to be modified to reduce interference with receiver. For example, when the interference score satisfies the threshold probability score, network analysis system 102 may modify a direction of a beam of one or more base stations, relocate a base station, deploy a base station at another location (e.g., beyond the threshold distance of the incumbent receiver), and/or the like to reduce interference with the incumbent receiver.

In some implementations, the one or more actions may include network analysis system 102 generating a report associated with the network being configured to facilitate communication via the targeted RF band with respect to interference with the incumbent receiver. For example, network analysis system 102 may generate the report to include information identifying the interference score, the total estimated downlink signal power measurements, the total estimated uplink signal power measurements, one or more base stations that may contribute to an interference, a period of time during which an interference occurs, and/or the like. The report may enable a user to identify one or more base stations to be modified to reduce the probability of interference, locations to deploy a base station to support communications via the targeted RF band, any potential affect (by the incumbent receiver) on a quality of communications via the targeted RF band, and/or the like.

In some implementations, the one or more actions may include network analysis system 102 providing the report to indicate a probability of interference between the incumbent receiver and a UE/base station communication. For example, network analysis system 102 may provide the report to the device of the user (e.g., in response to the request received from the device of the user). In some implementations, the report may enable one or more actions (e.g., relating to communications of UEs via the targeted RF band) to be implemented based on the information included in the report.

Some implementations herein describe a network analysis system that may determine an interference score associated with a probability of a UE interfering with an incumbent receiver when the UE is communicating, via the targeted RF band, with a base station within a threshold distance of the location of the incumbent receiver. By determining the interference score, the network analysis system may prevent the UE from causing an interference with the incumbent receiver (communicating via the targeted RF band) when the UE communicates via the targeted RF band. By preventing the interference, the network analysis system may conserve computing resources, network resources, and/or the like that would have been used to remedy packet loss, packet latency, packet jitter, packet retransmission, and/or the like associated with the interference.

As indicated above, FIGS. 1A-1D are provided merely as examples. Other examples may differ from what is described with regard to FIGS. 1A-1D.

Figure 2:
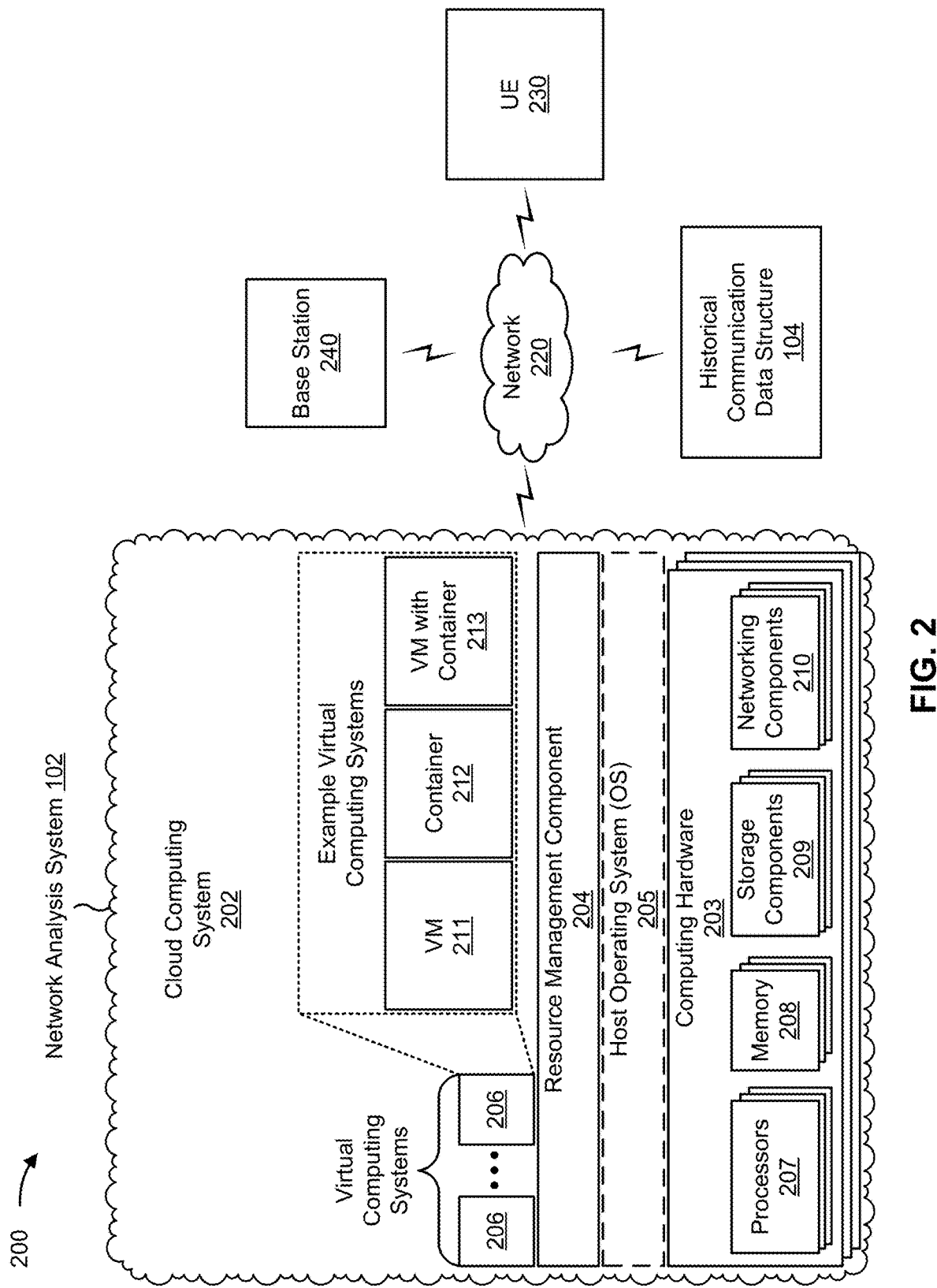
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network analysis system 102, which may include one or more elements of and/or may execute within a cloud computing system 202. The cloud computing system 202 may include one or more elements 203-213, as described in more detail below. As further shown in FIG. 2, environment 200 may include a historical communication data structure 104, a network 220, UE 230, and/or base station 240. Devices and/or elements of environment 200 may interconnect via wired connections and/or wireless connections.

Historical communication data structure 104 may include a data structure (e.g., a database, a linked list, a table, and/or the like) that stores information described herein. For example, historical communication data structure 104 may store historical signal power measurements of previous communications of a plurality of UEs. Historical communication data structure 104 may provide the information to network analysis system 102.

The cloud computing system 202 may include computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the network analysis system 102 may include one or more elements 203-213 of the cloud computing system 202, may execute within the cloud computing system 202, and/or may be hosted within the cloud computing system 202, in some implementations, the network analysis system 102 may not be cloud-based (e.g., may be implemented outside of a cloud computing system) or may be partially cloud-based. For example, the network analysis system 102 may include one or more devices that are not part of the cloud computing system 202, such as device 300 of FIG. 3, which may include a standalone server or another type of computing device. The network analysis system 102 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

UE 230 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 230 may be capable of communicating using uplink communications (e.g., UE to base station), downlink communications (e. g., base station to UE), and/or sidelink (e.g., UE-to-UE) communications. In some implementations, UE 230 may include a machine type communication (MTC) UE, such as an evolved or enhanced MTC (eMTC) UE. In some implementations, UE 230 may include an Internet of Things (IoT) UE, such as a narrowband IoT (NB-IoT) UE and/or the like.

Base station 240 may include one or more devices capable of communicating with one or more UEs 230 using a cellular Radio Access Technology (RAT). For example, base station 240 may include a base transceiver station, a radio base station, a node B, an evolved node B (eNB), a gNB, a base station subsystem, a cellular site, a cellular tower (e. g., a cell phone tower, a mobile phone tower, etc.), an access point, a transmit receive point (TRP), a radio access node, a macrocell base station, a microcell base station, a picocell base station, a femtocell base station, or a similar type of device. Base station 240 may transfer traffic between a UE 230 (e. g., using a cellular RAT), and/or a network. Base station 240 may provide one or more cells that cover geographic areas. Base station 240 may be a mobile base station. Base station 240 may be capable of communicating using multiple RATs.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
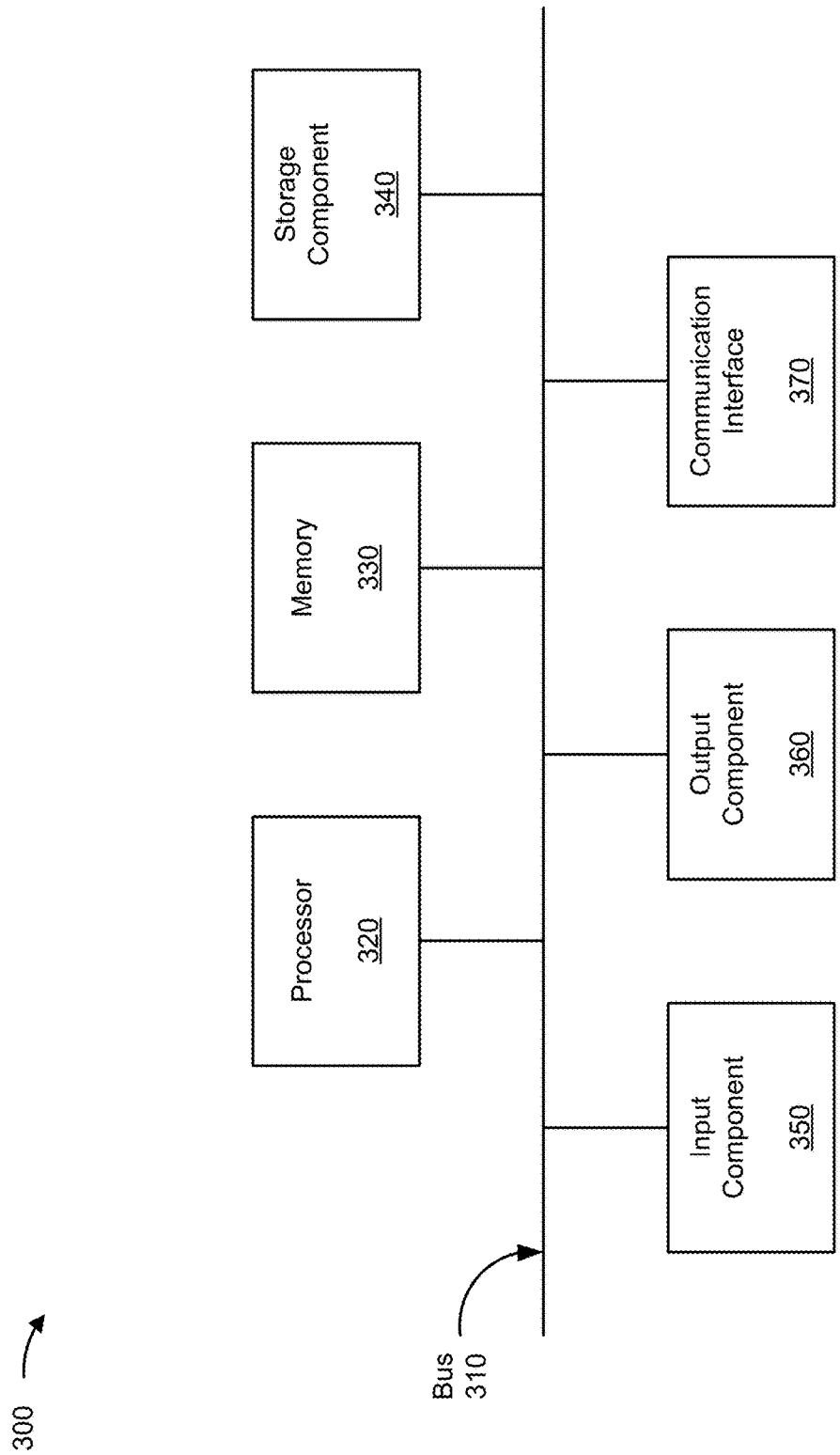
FIG. 3 is a diagram of example components of one or more devices of FIG. 2.

FIG. 3 is a diagram of example components of one or more devices 300 of FIG. 2. Device 300 may correspond to Network analysis system 102, historical communication data structure 104, UE 230, and/or base station 240. In some implementations, Network analysis system 102, historical communication data structure 104, UE 230, and/or base station 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
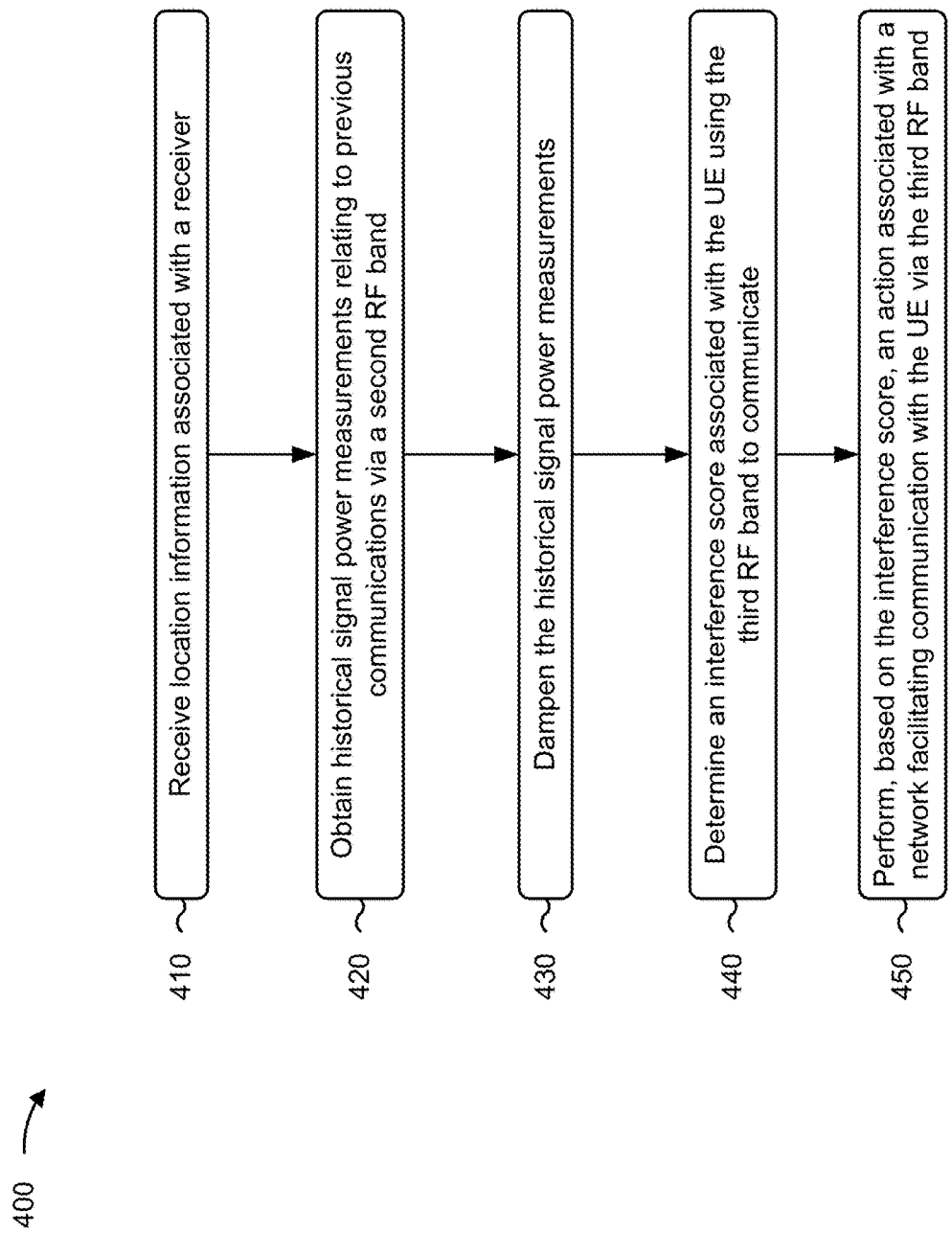
FIG. 4 is a flow chart of an example process relating to detecting interference probability within a radio frequency band.

FIG. 4 is a flowchart of an example process 400 associated with systems and methods for detecting interference probability within a radio frequency band. In some implementations, one or more process blocks of FIG. 4 may be performed by a network analysis system (e.g., network analysis system 102). In some implementations, one or more process blocks of FIG. 4 may be performed by another device or a group of devices separate from or including the network analysis system, such historical communication data structure (e.g., historical communication data structure 104), as a UE (e.g., UE 230), a base station (e.g., base station 240), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving location information associated with a receiver (block 410). For example, the network analysis system may receive location information associated with a receiver, as described above. In some implementations, the location information identifies a location of the receiver and the receiver is configured to communicate via a first radio frequency (RF) band. In a first implementation, the location information includes geographical coordinates, of the location, that are associated with a geographical information system.

As further shown in FIG. 4, process 400 may include obtaining historical signal power measurements relating to previous communications via a second RF band (block 420). For example, the network analysis system may obtain historical signal power measurements associated with a location of the receiver and relating to previous communications, via a second RF band, of a plurality of user equipment (UEs), as described above.

As further shown in FIG. 4, process 400 may include adjusting the historical signal power measurements (block 430). For example, the network analysis system may adjust the historical signal power measurements to model estimated signal power measurements relating to a UE communicating via a first RF band, as described above. In some implementations, a channel of the first RF band is within a threshold frequency range of a channel of the first RF band. In some implementations, a channel of the first RF band, via which the second communication device is communicating, is within a threshold frequency range of a channel of the first RF band via which the first communication device is configured to communicate.

In some implementations, adjusting the historical signal power measurements to model the estimated signal power measurements comprises: identifying, from the historical signal power measurements, downlink signal power measurements associated with previous downlink communications from the network to one or more of the plurality of UEs; adjusting the downlink signal power measurements to model estimated downlink signal power measurements based on power gains and power losses associated with the previous downlink communications using a downlink channel of the second RF band; identifying, from the historical signal power measurements, uplink signal power measurements associated with previous uplink communications to the network from one or more of the plurality of UEs, and adjusting the uplink signal power measurements to model estimated uplink signal power measurements based on path losses associated with distances between the plurality of UEs and the receiver during the previous uplink communications, the interference score is determined based on: comparing the estimated downlink signal power measurements and a downlink signal power threshold associated with downlink communications to the UE interfering with the receiver, and comparing the estimated uplink signal power measurements and an uplink signal power threshold associated with uplink communications from the UE interfering with the receiver.

In some implementations, the historical signal power measurements are associated with previous downlink communications, and the interference score is determined based on a comparison of the estimated signal power measurements and a downlink signal power threshold associated with downlink communications to the UE interfering with the receiver.

As further shown in FIG. 4, process 400 may include determining an interference score associated with the UE using the first RF band to communicate (block 440). For example, the network analysis system may determine, based on the estimated signal power measurements, an interference score associated with the UE using the first RF band to communicate, as described above. In some implementations, the interference score is associated with a probability of the UE interfering with the receiver when communicating, via the first RF band, with a base station within the threshold distance of the location.

In some implementations, the historical signal power measurements are associated with previous uplink communications, and the interference score is determined based on a comparison of the estimated signal power measurements and an uplink signal power threshold associated with uplink communications from the UE interfering with the receiver.

As further shown in FIG. 4, process 400 may include performing, based on the interference score, an action associated with a network facilitating communication with the UE via the first RF band (block 450). For example, the network analysis system may perform, based on the interference score, an action associated with a network facilitating communication with the UE via the first RF band, as described above.

In some implementations, performing the action comprises: controlling, based on the interference score, a signal power of a base station of the network to increase signal power toward the receiver when the interference score does not satisfy a threshold probability of interfering with the receiver, or decrease the signal power toward the receiver when the interference score satisfies the threshold probability.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    performing, by a device, adjustments for historical signal power measurements to model estimated signal power measurements relating to a user equipment (UE) communicating via a target radio frequency (RF) band,
        wherein the historical signal power measurements are associated with communications conducted via another RF band;
    determining, by the device and based on the estimated signal power measurements, an interference score associated with the UE using the target RF band to communicate; and
    performing, by the device and based on the interference score, an action associated with a network facilitating communication with the UE via the target RF band.

2. The method of claim 1, wherein performing the adjustments comprises:
    adjusting the historical signal power measurements based on one or more mathematical functions.

3. The method of claim 1, wherein performing the adjustments comprises:
    performing the adjustments based on a power loss and power gain associated with downlink communication via the other RF band.

4. The method of claim 1, wherein performing the adjustments comprises:
    performing the adjustments to compensate for different propagation characteristics or band sizes between the target RF band the other RF band.

5. The method of claim 1, wherein determining the interference score comprises:
    determining the interference score based on estimated downlink signal power measurements and a downlink signal power threshold.

6. The method of claim 1, wherein determining the interference score comprises:

applying weights to one or more of:
a downlink interference score,
an uplink interference score,
parameters corresponding to characteristics of a receiver,
characteristics of the UE, or
characteristics of a base station.

7. The method of claim 1, wherein performing the action comprises:
controlling a signal power of a base station according to the interference score.

8. A non-transitory computer-readable medium storing a set of instructions, the set of instructions comprising:
one or more instructions that, when executed by one or more processors of a device, cause the device to:
perform adjustments for historical signal power measurements to model estimated signal power measurements relating to a user equipment (UE) communicating via a target radio frequency (RF) band,
wherein the historical signal power measurements are associated with communications conducted via another RF band;
determine, based on the estimated signal power measurements, an interference score associated with the UE using the target RF band to communicate; and
perform, based on the interference score, an action associated with a network facilitating communication with the UE via the target RF band.

9. The non-transitory computer-readable medium of claim 8, wherein the one or more instructions, that cause the device to perform the adjustments, cause the device to:
perform the adjustments based on path loss associated with uplink communication via the other RF band.

10. The non-transitory computer-readable medium of claim 8, wherein the one or more instructions, that cause the device to perform the adjustments, cause the device to:
identify, from the historical power signal measurements, downlink power measurements associated with previous downlink communications.

11. The non-transitory computer-readable medium of claim 8, wherein the one or more instructions, that cause the device to determine the interference score, cause the device to:
determine the interference score based on estimated uplink signal power measurements and an uplink signal power threshold.

12. The non-transitory computer-readable medium of claim 8, wherein the one or more instructions, that cause the device to determine the interference score, cause the device to:
compare total downlink signal power measurements and a downlink signal power threshold.

13. The non-transitory computer-readable medium of claim 8, wherein the one or more instructions further cause the device to communicate,
wherein the target RF band includes one of 600 MHz band, 750 MHz band, 850 MHz band, Personal Communication Services (PCS) band, or Advance Wireless Services (AWS) band of an RF spectrum.

14. The non-transitory computer-readable medium of claim 8, wherein the one or more instructions, that cause the device to perform the adjustments, cause the device to:
perform a search of records to identify downlink signal power measurements associated with previous downlink communications.

15. A device, comprising:
one or more processors configured to:
perform adjustments for historical signal power measurements to model estimated signal power measurements relating to a user equipment (UE) communicating via a target radio frequency (RF) band,
wherein the historical signal power measurements are associated with communications conducted via another RF band;
determine, based on the estimated signal power measurements, an interference score associated with the UE using the target RF band to communicate; and
perform, based on the interference score, an action associated with a network facilitating communication with the UE via the target RF band.

16. The device of claim 15, wherein the one or more processors, to perform the adjustments, are configured to:
apply corrections based on differences between frequencies in the target RF band and the other RF band.

17. The device of claim 15, wherein the one or more processors, to perform the adjustments, are configured to:
identify, based on the historical power signal measurements, uplink power measurements associated with previous uplink communications.

18. The device of claim 15, wherein the one or more processors, to determine the interference score, are configured to:
combine a downlink interference score and an uplink interference score to determine the interference score.

19. The device of claim 15, wherein the other RF band includes one of 600 MHz band, 750 MHz band, 850 MHz band, Personal Communication Services (PCS) band, or Advance Wireless Services (AWS) band of an RF spectrum.

20. The device of claim 15, wherein the one or more processors, to perform the adjustments, are configured to:
perform a search of records to identify records identifying a location included in a geographical area of a predetermined shape and size.

* * * * *